(12) United States Patent
Hong et al.

(10) Patent No.: US 7,176,596 B2
(45) Date of Patent: Feb. 13, 2007

(54) PIVOT JOINT STRUCTURE FOR MOTOR ROTOR

(75) Inventors: Alex Hong, Kaohsiung (TW); Wang Ko Chien, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 11/248,247

(22) Filed: Oct. 13, 2005

(65) Prior Publication Data

US 2007/0013246 A1 Jan. 18, 2007

(30) Foreign Application Priority Data

Jul. 12, 2005 (TW) ............... 94123616 A

(51) Int. Cl.
*H02K 7/08* (2006.01)

(52) U.S. Cl. ............... 310/90; 310/67 R; 384/244

(58) Field of Classification Search ............ 310/90, 310/67 R; 384/100, 903, 244–246; 360/98.07, 360/99.04, 99.08

See application file for complete search history.

(56) References Cited

U.S. PATENT DOCUMENTS

| | | | | |
|---|---|---|---|---|
| 3,298,756 A | * | 1/1967 | Wilson | ............... 384/420 |
| 3,726,575 A | * | 4/1973 | Moorman | ............... 384/420 |
| 4,270,063 A | * | 5/1981 | Dochterman | ............... 310/66 |
| 4,330,725 A | * | 5/1982 | Hintz | ............... 310/82 |
| 4,968,910 A | * | 11/1990 | Meier et al. | ............... 310/42 |
| 5,442,247 A | * | 8/1995 | Suzuki et al. | ............... 310/67 R |
| 5,726,513 A | * | 3/1998 | Lyle et al. | ............... 310/91 |
| 5,793,132 A | * | 8/1998 | Hirose et al. | ............... 310/71 |
| 6,276,833 B1 | * | 8/2001 | Chen | ............... 384/226 |
| 6,280,089 B1 | * | 8/2001 | Horng | ............... 384/129 |
| 6,333,576 B1 | * | 12/2001 | Ishikawa et al. | ............... 310/85 |
| 6,800,975 B2 | * | 10/2004 | Long | ............... 310/89 |
| 6,836,041 B2 | * | 12/2004 | Chou et al. | ............... 310/90 |

* cited by examiner

*Primary Examiner*—Dang Le
(74) *Attorney, Agent, or Firm*—Bacon & Thomas

(57) ABSTRACT

The invention relates to a pivot joint structure of the motor rotor including a spindle and a snap ring. The spindle is centrally disposed in the rotor and the end thereof near the urging part has a scoop channel with smaller outer diameter. The urging part has at least one plane surface along the axial direction and the cross section is formed in a non-circular shape. The center hole of the snap ring takes the shape corresponding to that formed by the cross section(s) of the urging part and the gap therebetween provides a minimum space for the inserting in the urging part. Consequently, regardless of the assembly or disassembly of the rotor, the snap ring structure won't be affected and the deformation or fracture thereof won't take place.

4 Claims, 3 Drawing Sheets

US 7,176,596 B2

PIVOT JOINT STRUCTURE FOR MOTOR ROTOR

FIELD OF THE INVENTION

The invention relates to a pivot joint structure for motor rotor, which is used to hold and position the spindle so that the motor rotor can rotate with respect to the stator without being fallen off.

BACKGROUND OF THE INVENTION

As shown in FIG. 1, the motor structure contains a rotor 10 and a stator 20, which the rotor 10 has a spindle 11 and a shaft tube 21 is sleeved by the stator 20. The shaft tube 21 is disposed with a bearing 22 therein so that the spindle 11 of the rotor 10 can penetrate the bearing 22 and rotate therein. The snap ring 30 serves to hold and fasten the spindle 11, allowing the rotor 10 to rotate with respect to the stator 20 without fallen off.

Furthermore, FIG. 2 illustrates a pivot joint structure of a conventional motor rotor, wherein the end of the spindle near an urging part 12 has a scoop channel 13 with smaller external diameter, the snap ring 30 has a center hole 31 with a hole diameter less than that of the urging part 12, and the rim of the center hole 31 is disposed with a plurality of radial cuts 32. When pivoting the motor rotor 10, the urging part 12 is directly forced into the center hole 31 or the center hole is deformed to grip the scoop channel 13 by virtue of the design of the cuts 32.

Whereas, the aforementioned motor rotor is not able to be detached after being pivoted. As the assembly of the spindle 11 and the snap ring 30 pertains to the forced coupling pattern, the snap ring could be broken if the rotor 10 is forced out. In that case, after being assembled integrally, the stator 20 is impossible to be removed and thus needs to be replaced by a new one.

In addition, when pivoting the motor rotor 10, the urging part 12 is forced into the center hole 31 and the center hole is deformed to grip the scoop channel 13 so as to secure the pivoting purpose. However, after being deformed, the snap ring 30 cannot be restored to its original look, making the snap ring 30 and the spindle 11 prone to attrition and noise.

As such, as far as solving the issue that the motor rotor is not detachable and has noise from the rotation and enhancing the operating stability of the motor is concerned, an improvement toward the pivot joint structure of the motor rotor is urgently demanded.

SUMMARY OF THE INVENTION

Accordingly, the invention provides a motor joint structure including a spindle and a snap ring. The spindle is centrally disposed in the rotor and has a scoop channel with smaller outer diameter, which is located over one end in the proximity of an urging part. The urging part has at least one plane surface along the axial direction so as to form a non-circular shape. The center hole of the snap ring has the corresponding shape to that of the cross sections of the urging part and provides the at least room therein for the urging part to penetrate.

While pivoting the rotor, the urging part of the spindle needs to be oriented in an angle to match with the center hole. Meanwhile, the rotor is pulled upwardly by the magnetic attraction force of the stator to finish the pivoting. While detaching the rotor, the rotor is rotated to orient the urging part to the corresponding position of the center hole and is removed by exerting an external force. Consequently, regardless of the assembly or the disassembly of the rotor, the deformation or fracture of the snap ring will not be generated.

DETAILED DESCRIPTION OF THE PREFERRED EMBODIMENT

The invention relates to a pivot joint structure for motor rotor illustrated by the following preferred embodiments to describe the related positions of all parts in the present invention.

Figure 1:
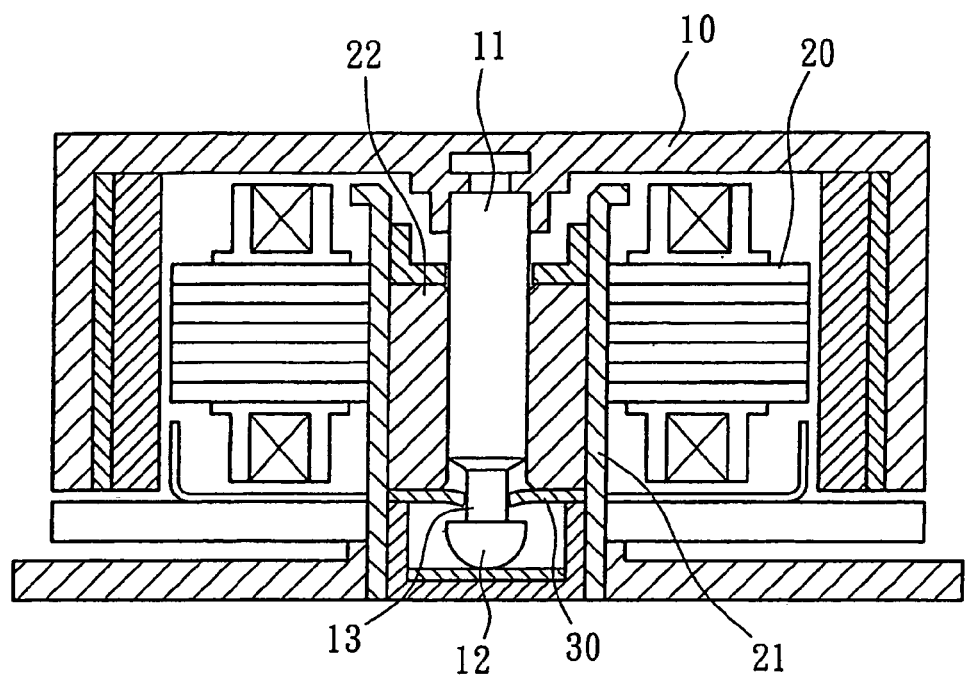
FIG. 1 is a cross-sectional schematic view showing the conventional structure applied in motor.
Figure 2:
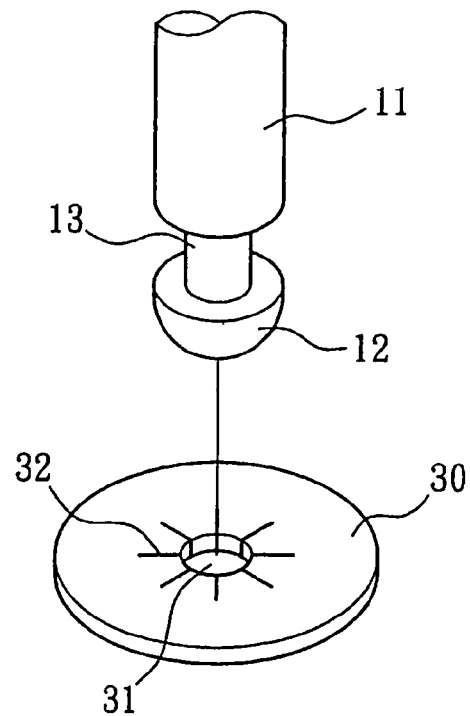
FIG. 2 is an exploded schematic view showing the conventional structure.
Figure 3:
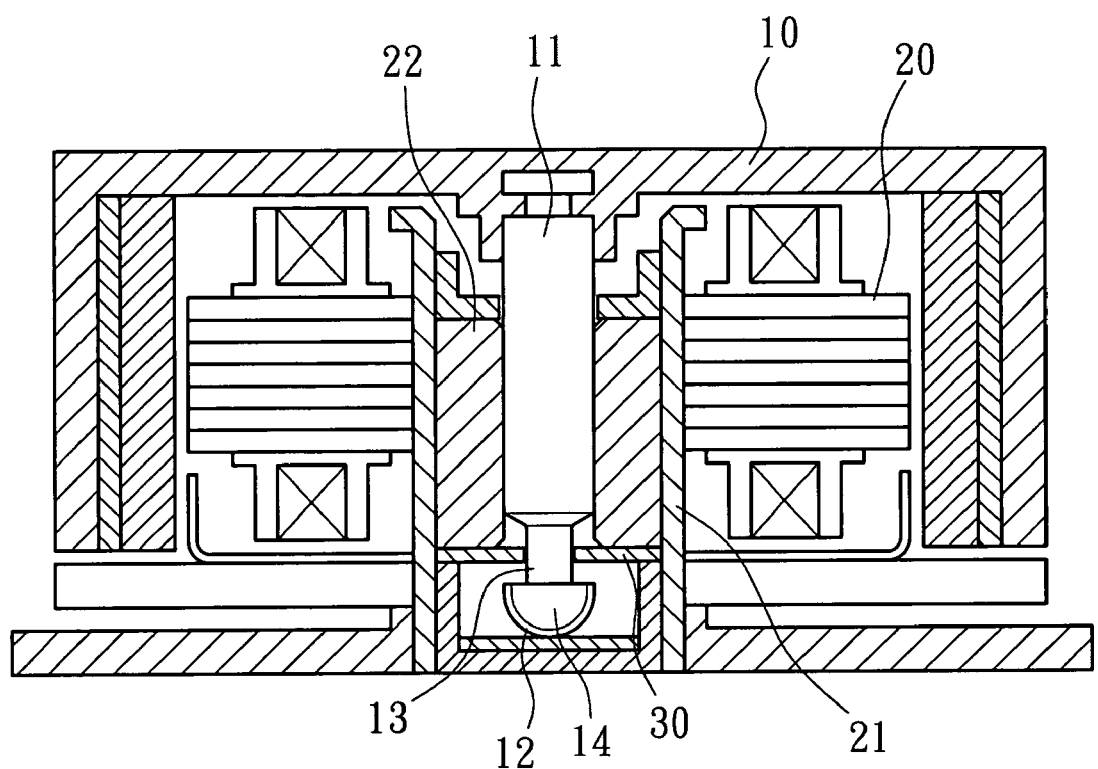
FIG. 3 is a cross-sectional schematic view of the first preferred embodiment in the present invention.

Please refer to FIG. 3. The motor structure is composed of a rotor 10 and a stator 20, which a spindle is centrally disposed in the rotor 10, the spindle 11 has a scoop channel with smaller outer diameter over the end near the urging part 12, and a shaft tube 21 is disposed in a stator 20 and a bearing 22 is sleeved in the shaft tube 21 so that the spindle 11 of the rotor 10 can penetrate the bearing 22 and rotate therein.

Figure 4:
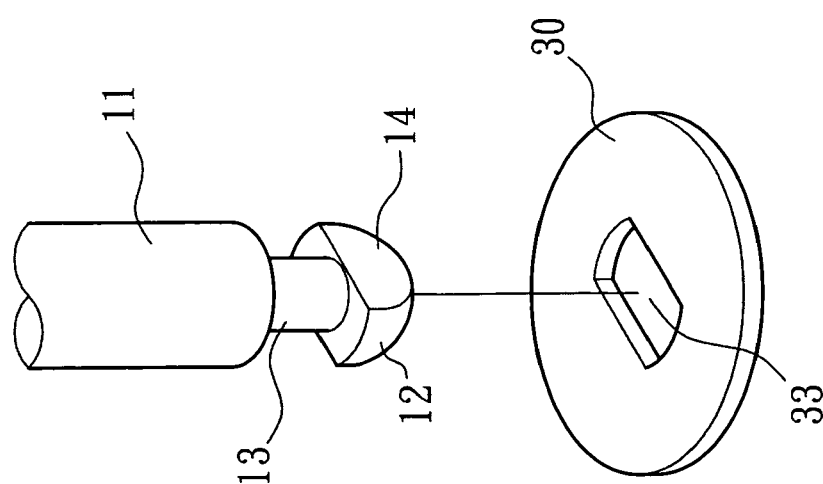
FIG. 4 is an exploded schematic view of the first preferred embodiment in the present invention.

FIG. 4 illustrates the first preferred embodiment of the present invention, wherein the urging part 12 of the spindle 11 has two parallel plane surfaces along the axial direction 14 so as to form a non-circular shape of the urging part 12, and the center hole 33 of the snap ring 30 is made to match the cross section of the urging part 12 in terms of shape and shall be slightly bigger than the urging part 12 in formation of a minimum gap therebetween for inserting in the urging part 12.

Figure 5:
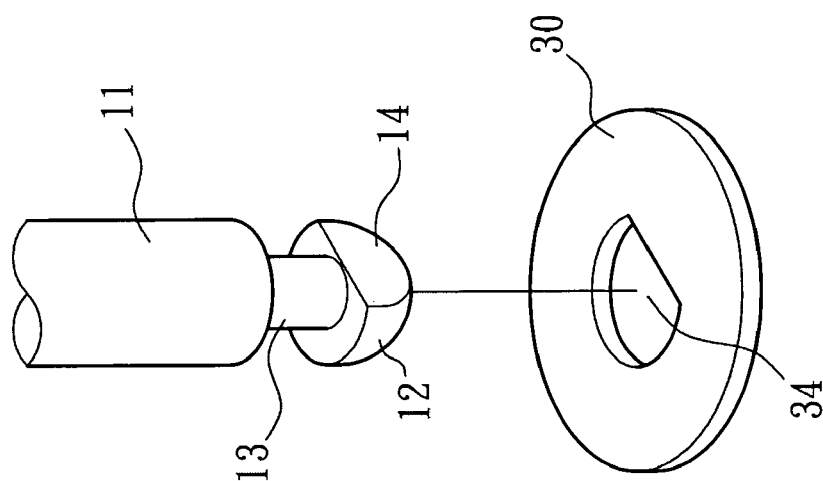
FIG. 5 is an exploded schematic view of the second preferred embodiment in the present invention.

FIG. 5 illustrates the second preferred embodiment of the present invention, wherein the urging part 12 of the spindle 11 has only one plane surface along the axial direction 14 so as to form a non-circular shape of the urging part 12 as well, and the center hole 34 of the snap ring 30 is made to match the cross section of the urging part 12 in terms of shape and shall be slightly bigger than the urging part 12 in formation of a minimum gap therebetween for inserting in the urging part 12.

Figure 6:
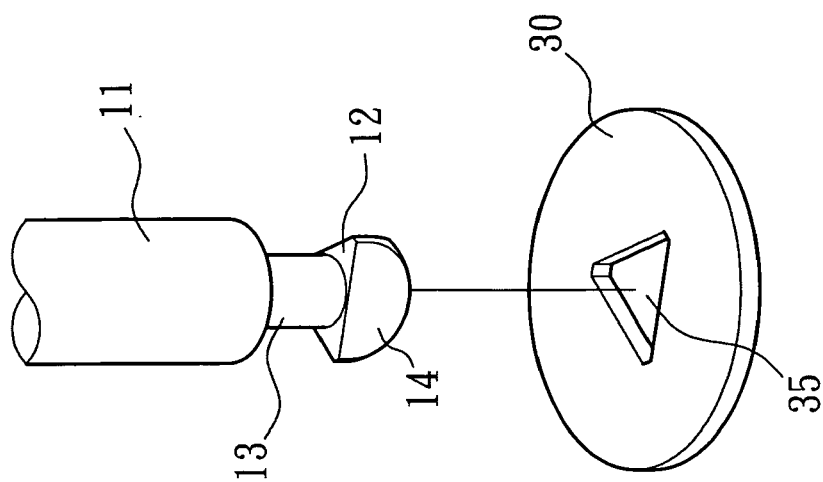
FIG. 6 is an exploded schematic view of the third preferred embodiment in the present invention.

FIG. 6 illustrates the third preferred embodiment of the present invention, wherein the urging part 12 of the spindle 11 has three plane surfaces along the axial direction 14 so as to form a non-circular shape of the urging part 12 as well, and the center hole 35 of the snap ring 30 is made to match the cross section of the urging part 12 in terms of shape and shall be slightly bigger than the urging part 12 in formation of a minimum gap therebetween for inserting in the urging part 12.

While pivoting the motor rotor 10, the spindle is inserted in the bearing 22 so that the urging part 12 exactly urges against the center hole 33, 34, 35 of the snap ring 30, and the rotor 10 is further rotated to an angle. When the urging part 12 is rotated to an angle to match with the center hole 33, 34, 35, the rotor 10 is pulled upwardly by the magnetic attraction force of the stator 10 to finish the pivoting.

Upon rotating the rotor 10, the magnetic attraction force of the stator 20 is sufficient to suck the rotor 10 without letting it float off. Therefore, there is no problem that the rotor 10 will fall off.

Upon detaching the motor rotor 10, the rotor 10 needs to be rotated so as to match with the center hole 33, 34, 35, and the rotor 10 is further removed by exerting an external force.

As a consequence, by all means, the assembly and the disassembly of the rotor in the present invention won't affect the snap ring structure and result in the drawbacks such as deformation or fracture of the snap ring, not only thoroughly resolving the issues that motor rotor is not detachable and has noise during rotation, but also enhancing the stability of the motor operation. Therefore, the present invention not only has a novelty and a progressiveness, but also has an industry utility.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A motor pivot joint structure, comprising:
   a spindle centrally disposed inside a rotor and having a scoop channel with an sunken outer diameter around a side of said spindle near an urging part with a non-circular cross section having at least one plane surface along an axial direction;
   a snap ring having a center hole with a shape matching with the cross section of said urging part to grip said scoop channel.

2. The motor pivot joint structure of claim 1, wherein a space between said center hole and said urging part is a minimum for insertion.

3. The motor pivot joint structure of claim 1, wherein said urging part has two parallel plane surfaces along an axial direction.

4. The motor pivot joint structure of claim 1, wherein said urging part has at least three plane surfaces along an axial direction.

* * * * *